L. H. BRINKMAN.
PIPE BENDING MACHINE.
APPLICATION FILED FEB. 3, 1912.
1,198,187.
Patented Sept. 12, 1916.
3 SHEETS—SHEET 3.
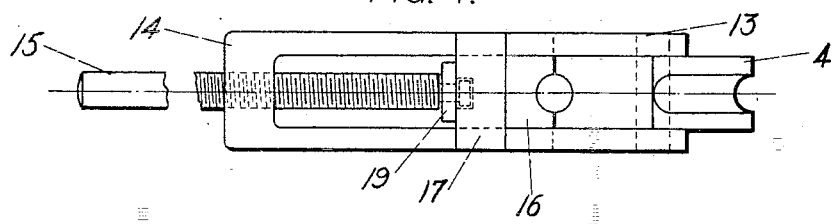
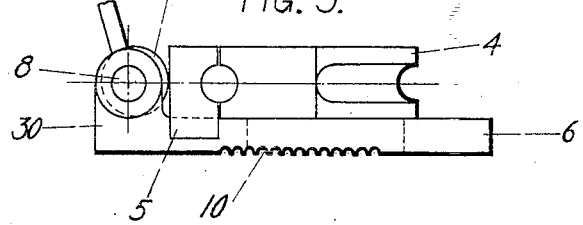
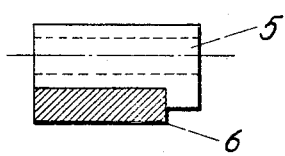
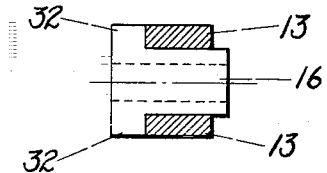
WITNESSES:
INVENTOR.
Louis H. Brinkman
BY
William W. Varney
ATTORNEY.

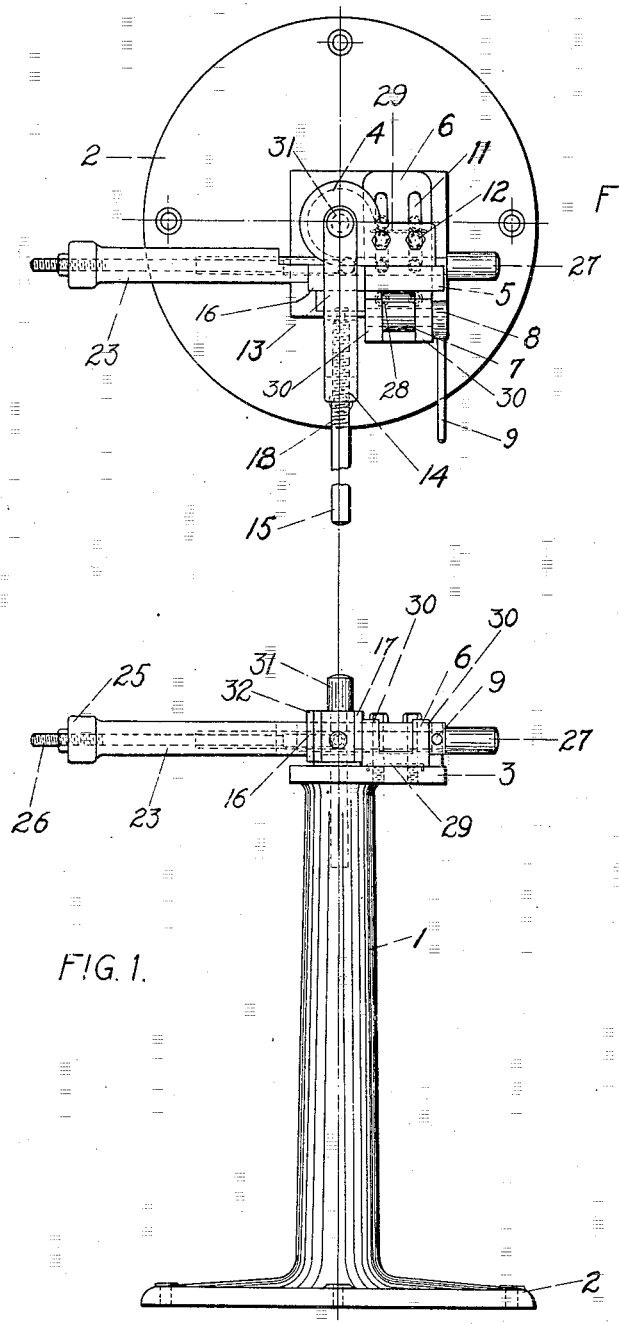

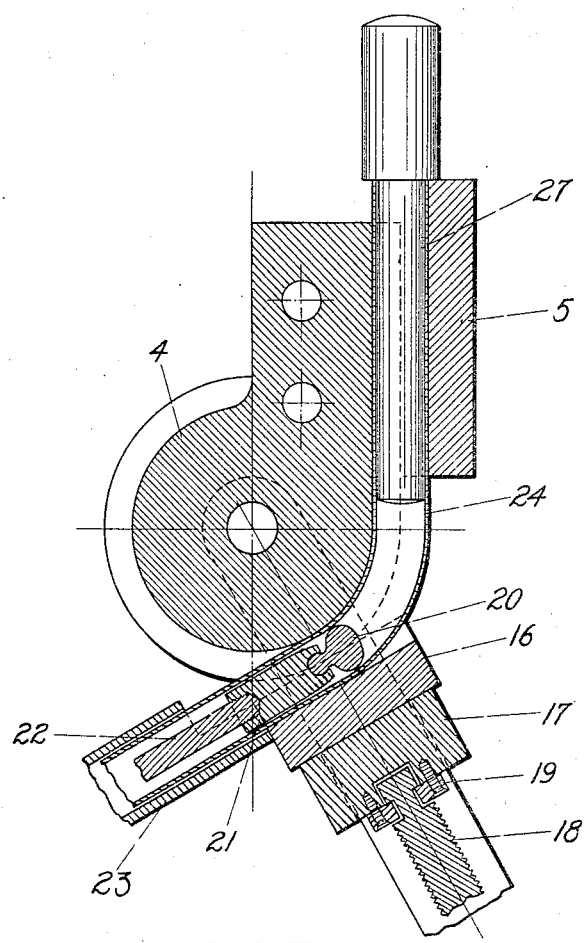

UNITED STATES PATENT OFFICE.

LOUIS H. BRINKMAN, OF GLEN RIDGE, NEW JERSEY, ASSIGNOR, BY MESNE ASSIGNMENTS, TO BALTIMORE TUBE COMPANY, INCORPORATED, A CORPORATION OF VIRGINIA.

PIPE-BENDING MACHINE.

1,198,187.

Specification of Letters Patent. Patented Sept. 12, 1916.

Application filed February 3, 1912. Serial No. 675,374.

*To all whom it may concern:*

Be it known that I, LOUIS H. BRINKMAN, a citizen of the United States, residing at Glen Ridge, in the county of Essex and State of New Jersey, have invented a new and useful Pipe-Bending Machine, of which the following is a specification.

My invention relates to improvements in pipe-bending machines, and the main object of my invention is to provide a hand-operated pipe-bending machine which is especially simple and cheaply constructed and yet which is capable of efficiently bending pipes uniformly, and at the same time maintaining a true cross-section thereof without producing scars thereon.

Further objects, features and advantages will more clearly appear from the detailed description given below taken in connection with the accompanying drawings which form a part of this specification, and show a machine embodying my improvements.

In the drawings Figure 1 is a view of the machine in elevation; Fig. 2 is a plan view of the same; Fig. 3 is a horizontal section taken through the machine in the plane of the pipe being bent; Fig. 4 is an enlarged view of the yoke in elevation; Fig. 5 is an enlarged view of the former and clamping-block with adjacent parts; Fig. 6 is an enlarged view of the clamping-block taken at right angles to that of Fig. 5; and Fig. 7 is an enlarged view of the end of the swiper.

Referring to the various figures, 1 represents a column having a base 2 adapted to be secured to the floor. The column 1 carries a table 3 for holding the various parts. In the table 3 are provided bolt-holes 28, and upon the top of the table is provided a projection 29 which is adapted to engage one of the recesses 10 in the block 6 (see also Fig. 5) which projection together with the bolts 12 firmly secures the block 6 to the table 3. The former 4 is secured by means of the bolts 12 on top of the clamping-block 6, and consequently to the table 3. The periphery of the former 4 is grooved or formed, as shown in the drawings, to fit the pipe or tube to be bent, and the diameter is such that the forming edge conforms to the radius of the bend which is desired to be put in the pipe.

5 represents a tightening or clamping-block operating adjacent to the former 4, its adjacent edge being also formed to fit the pipe or tube to be clamped. The end of the clamping-block 5 is provided with a dependent flange which engages the side of the block 6, as shown in Fig. 6, so that the block 6 acts as a rail upon which the clamping-block 5 slides. The block 6 is provided with two ears or lugs 30 in which is pivoted a shaft 8 carrying an eccentric cam 7 adapted to be operated by a handle 9 to force the block 5 toward the former 4 in order to firmly clamp the pipe therebetween.

The block 6 is provided with slots 11 so that upon loosening the screws 12 the block 6 may be moved relatively to the other parts in order to accommodate pipes of different sizes; in each case, however, the projection 29 will engage one of the recesses 10 in order that there will be no danger of the parts slipping relatively to one another after the bolts 12 are again tightened. Also the screws 12 may be temporarily removed for the purpose of putting on a former of different size.

13 represents a yoke having two arms pivoted to the center of the former 4, one above and one below, by means of a pin 31. The yoke carries a swiping or die-block 16 which at its end is provided with flanges 32 engaging the sides of the yoke so that the yoke forms a guide in which the block 16 slides. The swiping-block 16 is grooved or formed on its face in order to fit the pipe or tubing to be bent.

17 represents an operating-block for the end of the handle 15, the handle being secured to the same by means of a split collar 19 secured to the block 17 which collar engages with a head upon the end of the handle 15. The handle 15 is screw-threaded as at 18, the threads operating in the back of the yoke at 14 so that upon turning the handle 15 the swiping-die 16 may be adjusted toward and from the pipe to be bent.

21 represents a mandrel extending within the free end of the pipe and held in place in fixed relation with the swiping-die 16 by means of an arm 22 screw-threaded in the end of the casing 23, as shown in Fig. 2, the casing 23 being carried rigid with the swiping-block 16. The mandrel 21 carries in its end a ball-mandrel 20 which is secured to the mandrel 21 by a universal ball-and-socket joint, the end of the mandrel 21 being swaged around a connecting ball portion on the mandrel 20. The position of the mandrels 20 and 21 may be adjusted relatively to the swiping-die by turning the mandrel 21 so that the screw-threaded portion of the member 22 operates in the end 25 of the casing 23. An end mandrel 27 is provided for filling the end of the pipe or tube which is clamped by the block 5 in order to prevent the pipe from being crushed when it is so clamped.

When it is desired to bend a tube the mandrels 20 and 21 are adjusted to their proper positions relatively to the block 16, a tube is inserted in the machine, as shown in Figs. 1 and 2, and the handle 9 thrown in order to force the block 5 against one end of the tube in order to clamp the same rigidly with the former 4. Then the swiping-block 16 is adjusted by turning the handle 15. The handle 15 is then thrown about the pin 31 as an axis in order to produce the required bend in the pipe, as shown in Fig. 3.

Although I have described my improvements in great detail with respect to one particular form, nevertheless I do not desire to be limited to such details, except as clearly pointed out in the appended claims, since many changes and modifications may well be made without departing from the spirit and scope of my invention in its broader aspects.

Having fully and clearly described my improvements, what I claim as new and desire to secure by Letters Patent is:—

1. In a tube-bending machine the combination of a table, a block 6 adjustably secured on said table, a former having its center fixed with relation to said table and being removably secured on top of said block, a yoke having its free ends pivoted one above and one below the former, a swiper carried by the yoke and means carried by the block 6 for clamping the pipe with respect to the former.

2. In a tube-bending machine, the combination of a table, a block 6 adjustably secured on said table, a former having its center fixed with relation to said table, a yoke pivoted concentrically with said former, a swiper for bending the pipe about the former and carried by said yoke and adjustable therein to accommodate formers of different sizes and means carried by the block 6 for clamping the pipe with respect to the former, said means embracing a clamping block, a hand-operated cam for forcing the clamp against the pipe, a mandrel carried in fixed relation to the swiper and extending within the unsecured end of the pipe and a ball-mandrel secured to the end of the first-mentioned mandrel by a universal joint.

LOUIS H. BRINKMAN.

Witnesses:
 EDWARD P. REYNOLDS,
 DAN'L F. REISENWEBER.